United States Patent [19]

Deller et al.

[11] Patent Number: 5,004,719
[45] Date of Patent: Apr. 2, 1991

[54] MOLDED ARTICLES BASED ON PYROGENICALLY PRODUCED ZIRCONIUM DIOXIDE METHOD FOR THEIR MANUFACTURE, AND USE THEREOF

[75] Inventors: Klaus Deller, Hainburg; Manfred Ettlinger, Karlstein; Rainhard Klingel, Alzenau; Helmfried Krause, Rodenbach, all of Fed. Rep. of Germany

[73] Assignee: DEGUSSA Aktiengesellschaft, Frankfurt am Main, Fed. Rep. of Germany

[21] Appl. No.: 488,381

[22] Filed: Feb. 23, 1990

Related U.S. Application Data

[63] Continuation of Ser. No. 305,397, Feb. 2, 1989, abandoned.

[30] Foreign Application Priority Data

Feb. 9, 1988 [DE] Fed. Rep. of Germany ....... 3803898

[51] Int. Cl.$^5$ .......................... B01J 21/06; B01J 21/16
[52] U.S. Cl. ..................... 502/242; 502/84; 502/349
[58] Field of Search .................. 502/62, 84, 400, 407, 502/349, 242

[56] References Cited

U.S. PATENT DOCUMENTS

| 2,265,682 | 12/1941 | Bennett | 502/84 |
| 2,934,504 | 4/1960 | Talvenheimo | 502/62 |
| 3,650,713 | 3/1972 | Chinchen et al. | 502/84 |
| 4,036,783 | 7/1977 | Blechschmitt et al. | 502/350 |

FOREIGN PATENT DOCUMENTS

| 3438217 | 4/1986 | Fed. Rep. of Germany | 502/349 |
| 2063700 | 6/1981 | United Kingdom | 502/84 |

Primary Examiner—Carl F. Dees
Attorney, Agent, or Firm—Beveridge, DeGrandi & Weilacher

[57] ABSTRACT

Molded, or pressed articles on pyrogenically produced zirconium dioxide are disclosed and having the following features:

| | |
|---|---|
| outside diameter | 2–15 mm |
| BET surface area per DIN 66 131 | 30–50 m$^2$/g |
| total pore volume | 0.3–0.8 ml/g |
| pore size distribution | no pores < 10 nm, at least 80% of the pores in the range of 10–70 nm diameter |
| crushing strength | 40–300 N |
| composition | at least 98% ZrO$_2$, SiO$_2$, remainder Al$_2$O$_3$, and/or HfO$_2$. |

These molded articles are manufactured by homogenizing pyrogenically produced zirconium dioxide with any one of kaolin, sugar, or urea, or mixtures while water is being added, by drying the mixture at a temperature of 80° to 120° C. and then comminuting it into a friable powder which then is pressed into molded articles which thereupon are annealed for 1 to 4 h at 600° to 1,000° C. The pressed articles are used as catalysts or as catalyst-carriers.

4 Claims, No Drawings

MOLDED ARTICLES BASED ON PYROGENICALLY PRODUCED ZIRCONIUM DIOXIDE METHOD FOR THEIR MANUFACTURE, AND USE THEREOF

This application is a continuation of Ser. No. 305,397 filed Feb. 2, 1989 and now abandoned.

INTRODUCTION AND BACKGROUND

The present invention relates to molded; i.e. pressed, articles based on pyrogenically produced zirconium dioxide, the method for their preparation and their use as catalyst-carriers or catalysts.

Pyrogenically produced oxides are characterized by their exceedingly fine-particulate nature and their correspondingly high specific surfaces, their very high purities, spherical particle shapes and the lack of pores. On account of these properties, pyrogenically produced oxides are becoming increasingly significant as carriers for catalysts (D. Koth, H. Ferch, Chem. Ing. Techn. 52, 628 [1980]).

Pyrogenically produced zirconium dioxide is known. It is described in the German patent 36 11 449 Degussa AG). The properties, characteristics and composition thereof including impurities present therein are well known in the art.

However molded articles made of pyrogenically produced zirconium oxide are not known.

Because as a rule such pressed articles are used as catalysts or as catalyst-carriers, it is the object of the invention to provide molded, or pressed articles from pyrogenically produced zirconium dioxide which can be used in catalytic procedures.

SUMMARY OF THE INVENTION

An object of the present invention is to provide pressed articles based on pyrogenically produced zirconium dioxide exhibiting the following physical-chemical features:

| | |
|---|---|
| outside diameter | 2–15 mm |
| BET surface area per DIN 66 131 | 30–50 m$^2$/g |
| total pore volume | 0.3–0.8 ml/g |
| pore size distribution | no pores <10 nm, at least 80% of pores in the 10–70 nm range |
| crushing strength | 40–300 N |
| composition | at least 92% ZrO$_2$, remainder SiO$_2$, Al$_2$O$_3$, HfO$_2$. |

The pressed articles of the invention can be manufactured in the most diverse shapes such as cylindrical, spherical, annular etc. with an outside diameter of 2–15 mm.

Another object of the invention is to provide a method for manufacturing the pressed articles based on pyrogenically produced zirconium dioxide having the following physical-chemical features:

| | |
|---|---|
| outside diameter | 2–1.5 mm |
| BET surface area per DIN 66 131 | 30–50 m$^2$/g |
| total pore volume | 0.3–0.8 ml/g |
| pore size distribution | no pores <10 nm, at least 80% of pores in the 10–70 nm range |
| crushing strength | 40–300 N |
| composition | at least 92% ZrO$_2$, remainder one or more of SiO$_2$, Al$_2$O, HfO$_2$ |

The method is characterized in that pyrogenically produced zirconium dioxide is homogenized with kaolin and/or graphite and/or sugar, and/or urea while water is being added to form a mixture. The mixture is dried at a temperature between 80° and 120° C. and then is comminuted into a friable or free flowing powder. Then the powder is molded into pressed articles which then are annealed for 1 to 4 hours at 600° to 1,000° C.

In a particular embodiment of the invention, the mixture may have the following composition prior to pressing:

| |
|---|
| 50–90% preferably 70–85% by, by weight of zirconium dioxide, |
| 5–50%, preferably 15–30% by weight of urea and/or sugar, |
| 0.1–10%, preferably 1–5%, by weight of kaolin, |
| 0.1–10%, preferably 1–5%, by weight of graphite. |

In principle all mixers or mills that permit good homogenization are suitable for carrying out the method of the invention. For instance, paddle-, fluidization-, impeller-or airflow-mixers can be used. EspeciallY suitable are mixers allowing further compaction of the mixed material. Illustratively, these are plowshare mixers, pan grinders and muller mixers or ball mills.

Following homogenization, substantial drying may be carried out at 80°–120° C., so that, upon comminution, a friable powder shall be obtained. The manufacture of the pressed or molded articles can be carried out on punch presses, eccentric presses, extruders or revolving presses, also on compactors.

The pressed articles are annealed for 1 to 4 hours at 600° to 1,000° C.

The crushing-strength, the specific total surface and the pore volume can be controlled within limits by changing the proportions of the input materials.

The molded articles of the invention can be used directly, or as catalysts or catalyst-supports, by impregnating them during or after their manufacture with a solution of a catalytically active substance and where called for by activating them by suitable post-treatment. Any suitable catalytically active substance which are all well known in the art, can be used for this purpose.

The molded articles of the invention made of pyrogenically produced zirconium oxide illustratively may be used, following deposition thereon of precious metals, base metals, precious-metal oxides or base-metal oxides, as catalysts in many reactive oxidation. For example, they can be used in reactions, in hydrogenation, in steam reforming, reforming hydrocarbons, methanization and in Fischer-Tropsch synthesis.

The molded articles or the invention offer the following advantages:
High chemical purity,
Temperature resistance,
High mechanical strength,
High pore-volume,
The major portion of the pores is in the range of 10 to 70 nm,
No pores <10 nm, Acid resistance.

EXAMPLES

Zirconium dioxide with the following physical-chemical features is used as the pyrogenically produced zirconium dioxide:

| | |
|---|---|
| BET surface | 40 ± 10 m²/g |
| Mean size of the primary particles | 30 nm |
| DIN 53 194 stamping density of normal material | 200 g/l |
| DIN 53 194 drying loss (2 h at 105° C.) | 1% |
| DIN 53 194; 55 921 annealing loss (2 h at 1,000° C.) (relaive to the material dried for 2 h at 105° C.) | 1% |
| DIN 53 200 pH value in 4% aqueous solution | 5.5–6.5 |
| $ZrO_2$ relative to the material annealed at 1,000° C. for 2 h | 97.00% |
| $HfO_2$ relative to the material annealed at 1,000° C. for 2 h | 2.00% |
| $Fe_2O_3$ relative to the material annealed at 1,000° C. for 2 h | 0.02% |
| $TiO_3$ relative to the material annealed at 1,000° C. for 2 h | 0.01% |
| HCl relative to the material annealed for 2 h at 1,000° C. (HCl content is part of the annealing loss) | 0.10% |
| $SiO_2$ relative to the material annealed for 2 h at 1,000° C. | 0.01% |
| $Al_2O_3$ relative to the material annealed for 2 h at 1,000° C. | 0.10% |

The BET surface is determined with nitrogen per DIN 66 131.

The total pore volume is computed form the sum of the micro-, meso- and macro-pores.

The crushing strength is ascertained using a type TBH 28 tester made by Ewerka Co.

The above pyrogenically produced zirconium oxide is representative of the material that can be used for purposes of the invention.

The micro- and meso-pores are determined by recording an $N_2$ isotherm and evaluating it according to BET, de Boer & Barret, Joyner, Halenda.

The macropores are determined by the Hg compaction procedure.

DETAILED DESCRIPTION OF THE INVENTION

EXAMPLE 1

75 % of pyrogenic $ZrO_2$,
20 % urea,
2 % kaolin
3 % graphite
are homogenized while water is being added. The mixture is then dried for 24 hours at 100° C. and comminuted into a friable powder.

Pelletizing is carried out on an eccentric press.

The resulting crude pellets are annealed at 900° C. for 3 hours. The articles so pressed exhibit the following physical-chemical features:

| | |
|---|---|
| outside diameter | 5 mm |
| DIN BET surface area | 36 m²/g |
| total pore volume | 0.62 ml/g |
| pore size distribution | no pores of <10 nm 82% of pores are in the range of 10–70 nm diameter |
| crushing strength | 235 N |
| composition | 95.7% $ZrO_2$ 1.8% $HfO_2$ 1.3% $SiO_2$ 1.2% $Al_2O_3$. |

EXAMPLE 2

80% zirconium dioxide, and
20% sugar (saccharose)
are mixed, dried and pressed in the manner of Example 1.

The crude pellets are annealed for 2 hours at 700° C. The pressed articles so obtained exhibit the following physical-chemical properties:

| | |
|---|---|
| outside diameter | 9 mm |
| DIN BET surface area | 40 m²/g |
| total pore volume | 0.42 ml/g |
| pore size distribution | no pores <10 nm in diameter 86% of the pores are in the range of 10–70 nm diameter |
| crushing strength | 56 N |
| composition | 98% $ZrO_2$ 2% $HfO_2$. |

Further variations and modifications will be apparent to those skilled in the art from the foregoing and are intended to be encompassed by the appended claims.

German priority application P 38 03 898.6-45 is relied on and incorporated herein.

We claim:

1. A molded article formed by pressing a composition comprising pyrogenically produced zirconium dioxide into a desired shape and firing, said molded article having the following properties:

| | |
|---|---|
| outside diameter | 2–15 mm |
| BET surface area per DIN 66 131 | 30–50 m²/g |
| total pore volume | 0.3–0.8 ml/g |
| pore size distribution | no pores < 10 nm, at least 80% of pores in 10–17 nm range |
| crushing strength | 40–300 N |
| composition | at least 92% $ZrO_2$, remainder one or more of $SiO_2$, $Al_2O$, $HfO_2$. |

2. A method for manufacturing a molded article from pyrogenically produced zirconium dioxide wherein the molded article has the following physical-chemical features:

| | |
|---|---|
| outside diameter | 2–15 mm |
| BET surface area per DIN 66 131 | 0.3–50 m²/g |
| total pore volume | 0.3–0.8 ml/g |
| pore size distribution | no pores < 10 nm, at least 80% of pores in the range of 10–70 nm |
| crushing strength | 40–300 N |
| composition | at least 92% $ZrO_2$, remainder one or more of $SiO_2$, $Al_2O_3$, $HfO_2$, | comprising homogenizing pyrogenically produced zirconium dioxide with at least one member of the group consisting of kaolin, graphite, sugar and urea, in the presence of water to form a mixture, drying said mixture at a temperature of 80°–120° C., and then comminuting the dried mixture into a friable powder, pressing the powder so obtained into a shaped article and annealing the molded article for 1 to 4 hours at 600° to 1000° C.

3. A catalyst support comprising the molded article of claim 1 in the shape of a pellet.

4. A catalyst comprising the catalyst support formed of the molded article of claim 1 having a catalytically active substance deposited thereon.

* * * * *